United States Patent
Akins, III

(10) Patent No.: US 7,765,280 B2
(45) Date of Patent: Jul. 27, 2010

(54) DOWNLOADABLE REMOTELY STORED DEVICE DRIVERS FOR COMMUNICATION WITH SET-TOP BOX PERIPHERALS

(75) Inventor: Glendon L. Akins, III, Fort Collins, CO (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 2146 days.

(21) Appl. No.: 10/289,197

(22) Filed: Nov. 6, 2002

(65) Prior Publication Data

US 2004/0088180 A1    May 6, 2004

(51) Int. Cl.
  *G06F 15/16* (2006.01)
(52) U.S. Cl. ...................................... 709/219
(58) Field of Classification Search ................ 709/203, 709/217–226; 717/168–178
  See application file for complete search history.

(56) References Cited

U.S. PATENT DOCUMENTS

| | | | | |
|---|---|---|---|---|
| 4,054,911 A * | 10/1977 | Fletcher et al. | ............. | 348/463 |
| 6,157,719 A * | 12/2000 | Wasilewski et al. | ......... | 380/210 |
| 6,166,730 A * | 12/2000 | Goode et al. | ................ | 715/716 |
| 6,199,076 B1 | 3/2001 | Logan et al. | ............. | 715/501.1 |
| 6,204,842 B1 | 3/2001 | Fujii | .......................... | 715/717 |
| 6,253,375 B1 * | 6/2001 | Gordon et al. | ................ | 725/88 |
| 6,256,673 B1 * | 7/2001 | Gayman | ..................... | 709/232 |
| 6,367,019 B1 | 4/2002 | Ansell et al. | ................... | 726/26 |
| 6,408,128 B1 | 6/2002 | Abecassis | .................... | 386/68 |
| 6,496,205 B1 | 12/2002 | White et al. | ................ | 715/824 |
| 6,526,508 B2 | 2/2003 | Akins et al. | | |
| 6,675,212 B1 | 1/2004 | Greenwood | ................. | 709/224 |
| 6,694,354 B1 * | 2/2004 | Elg | ............................. | 709/217 |
| 6,694,511 B1 * | 2/2004 | Yokote | ....................... | 717/148 |
| 6,772,420 B1 * | 8/2004 | Poger et al. | .................. | 719/327 |
| 6,779,004 B1 * | 8/2004 | Zintel | .......................... | 709/227 |
| 6,779,039 B1 | 8/2004 | Bommareddy et al. | | |
| 6,904,264 B1 | 6/2005 | Frantz | ........................ | 455/3.04 |
| 7,007,093 B2 * | 2/2006 | Spicer et al. | ................. | 709/229 |
| 7,072,950 B2 * | 7/2006 | Toft | ............................. | 709/219 |
| 7,076,536 B2 * | 7/2006 | Chiloyan et al. | ............. | 709/220 |
| 7,165,098 B1 * | 1/2007 | Boyer et al. | ................. | 709/219 |
| 7,200,855 B2 * | 4/2007 | Laksono | ....................... | 725/82 |
| 2001/0029583 A1 | 10/2001 | Palatov et al. | ............... | 713/193 |
| 2001/0054087 A1 | 12/2001 | Flom et al. | ................... | 709/218 |
| 2002/0002039 A1 | 1/2002 | Qureshey et al. | ............ | 455/344 |
| 2002/0013813 A1 * | 1/2002 | Matsuoka | .................... | 709/204 |
| 2002/0062357 A1 | 5/2002 | Srinivasan | ................... | 709/219 |

(Continued)

FOREIGN PATENT DOCUMENTS

JP     2003288081     10/2003

(Continued)

OTHER PUBLICATIONS

Jan. 14, 2000 Tech Review on "i2Go's eGo: A practical reason to embrace MP3?," pp. 1.2.

(Continued)

*Primary Examiner*—Benjamin R Bruckart
(74) *Attorney, Agent, or Firm*—Merchant & Gould

(57) ABSTRACT

A system that downloads device drivers for peripheral devices to a media client device includes, among other things, a memory with logic, and a processor configured with the logic to download a peripheral device driver to a media client device in response to a peripheral device interfacing with the media client device.

39 Claims, 8 Drawing Sheets

U.S. PATENT DOCUMENTS

| | | | |
|---|---|---|---|
| 2002/0073185 A1* | 6/2002 | Lee et al. | 709/222 |
| 2002/0078142 A1* | 6/2002 | Moore et al. | 709/203 |
| 2002/0107802 A1 | 8/2002 | Philips | 705/51 |
| 2002/0111912 A1 | 8/2002 | Hunter et al. | 705/52 |
| 2002/0146122 A1 | 10/2002 | Vestergaard et al. | 380/231 |
| 2002/0147661 A1 | 10/2002 | Hatakama et al. | 705/26 |
| 2003/0005437 A1 | 1/2003 | Feuer et al. | 725/34 |
| 2003/0009542 A1* | 1/2003 | Kasal et al. | 709/222 |
| 2003/0069964 A1* | 4/2003 | Shteyn et al. | 709/225 |
| 2003/0074323 A1* | 4/2003 | Catan | 705/59 |
| 2003/0108331 A1* | 6/2003 | Plourde et al. | 386/83 |
| 2003/0195951 A1* | 10/2003 | Wittel et al. | 709/220 |
| 2003/0220988 A1* | 11/2003 | Hymel | 709/220 |
| 2004/0039648 A1 | 2/2004 | Candelore et al. | 705/26 |
| 2004/0049796 A1* | 3/2004 | Briggs | 725/131 |
| 2004/0086120 A1 | 5/2004 | Akins et al. | |
| 2004/0193900 A1 | 9/2004 | Nair | 713/193 |
| 2004/0221081 A1* | 11/2004 | Yao et al. | 710/302 |
| 2005/0004994 A1 | 1/2005 | Chevallier et al. | 709/219 |
| 2006/0059095 A1 | 3/2006 | Akin et al. | |

OTHER PUBLICATIONS

Sep. 1, 2000 i2Go eGo press release entitled "Test Drive of The i2Go eGo with IBM MicroDrive.", pp. 1-4.

Certain internet advertisements for Diamond Rio MP3 players with description of Rio 900 MP3 player. Dated Dec. 10, 2002.

Certain Audible.com web page advertisements for MP3 players. Dated Dec. 10, 2002.

G David Peters: "Transformations: Technology and the music industry"; Teaching Music; Dec 2001. vol. 9, Iss. 3; p. 1-6.

Official Action mailed Aug. 26, 2009 in U.S. Appl. No. 11/270,297, pp. 1-27.

Official Action mailed Apr. 3, 2009 in U.S. Appl. No. 11/270,297, pp. 1-30.

Official Action mailed Oct. 7, 2008 in U.S. Appl. No. 11/270,297, pp. 1-24.

Official Action mailed Feb. 8, 2006 in U.S. Appl. No. 10/289,051, pp. 1-7.

Official Action mailed Jul. 31, 2006 in U.S. Appl. No. 10/289,051, pp. 1-8.

Official Action mailed Jan. 17, 2007 in U.S. Appl. No. 10/289,051, pp. 1-7.

Official Action mailed May 25, 2007 in U.S. Appl. No. 10/289,051, pp. 1-8.

* cited by examiner

DOWNLOADABLE REMOTELY STORED DEVICE DRIVERS FOR COMMUNICATION WITH SET-TOP BOX PERIPHERALS

TECHNICAL FIELD

The present invention is generally related to television systems, and, more particularly, is related to peripheral device support in television systems.

BACKGROUND OF THE INVENTION

With recent advances in digital transmission technology, subscriber television systems are now capable of providing much more than traditional analog broadcast video. In implementing enhanced programming, the home communication terminal ("HCT"), otherwise known as the set-top box, has become an important computing device for accessing content services (and content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at the user's site. Some of the software executed by a DHCT can be downloaded and/or updated via the subscriber television system. Each DHCT also typically includes a processor, communication components, and memory, and is connected to a television set or other display device, such as a personal computer, and can be further connected to peripheral devices like portable audio players, printers, or digital cameras, among others. While many conventional DHCTs are stand-alone devices that are externally connected to a television set, a DHCT and/or its functionality may be integrated into a television or personal computer or even an audio device such as a programmable radio, as will be appreciated by those of ordinary skill in the art.

There are a variety of peripheral devices available with varying formats for communication with client devices, such as DHCTs. For example, a peripheral device such as an MP3 player can use communication formats such as Universal Serial Bus (USB), Firewire (IEEE 1394), Bluetooth, as well as proprietary formats, among others. DHCTs equipped to communicate with peripheral devices, for example via a USB port, may either use a significant portion of memory to store the many varieties of device drivers to enable communication according to these formats, or operate with a limited selection of device drivers resulting in limited peripheral device compatibility. Thus, a need exists in the industry to address the aforementioned and/or other deficiencies and/or inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
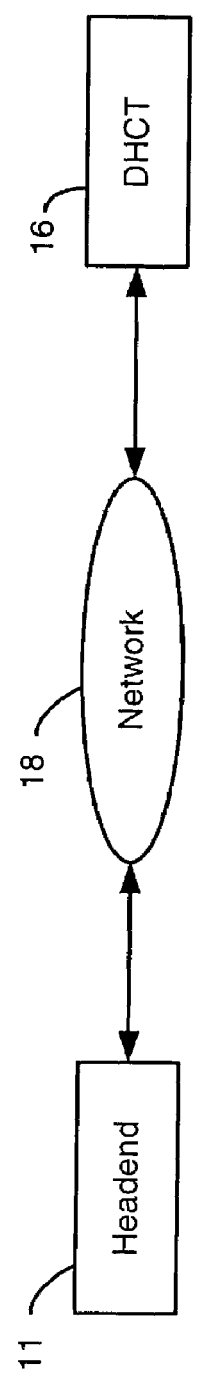
FIG. 1 is a block diagram of an example subscriber television system (STS), in accordance with one embodiment of the invention.

Preferred embodiments of the invention now will be described more fully hereinafter with reference to the accompanying drawings, in which preferred embodiments of the invention are shown. One way of understanding the preferred embodiments of the invention includes viewing them within the context of a subscriber television system. In particular, the preferred embodiments of the invention include systems and methods for maintaining a library of device drivers at a server located remotely (e.g., at a headend) and downloading, preferably upon request from a digital home communication terminal (DHCT), one or more device drivers from the headend to be used by the DHCT to communicate with one or more peripheral devices that are connected to the DHCT. As is understood by those having ordinary skill in the art, device drivers include programming code that control and provide software interface to a peripheral device when connected to a device such as a DHCT. Although the terms "connected" or "connection" or similar terms will be used herein when referring to the interaction or interfacing between the DHCT and a peripheral device, it will be understood that practically any interfacing between the DHCT and peripheral device is within the scope of the preferred embodiments of the invention, whether the interfacing occurs via an actual physical connection or via wireless communication. The preferred embodiments of the invention use peripheral device information, such as vendor and/or device identification (ID) acquired at the DHCT when the peripheral device is connected, to search for and retrieve from the library a device driver suitable for use with the connected peripheral device.

The retrieved device driver is then downloaded to the DHCT for use by an operating system and/or an application running on the DHCT to communicate with the peripheral device.

Although other communication environments and other peripheral devices are considered to be within the scope of the preferred embodiments, the preferred embodiments of the invention are described in the context of a DHCT that can support a plurality of peripheral device communication formats for a music service, among other services, in cooperation with a server side device driver application that supplies the device drivers and a server side music application that supplies the music. Thus, an example subscriber television system is introduced, along with select components in an example headend and an example DHCT. Because the DHCT will be described in an implementation wherein the DHCT detects a connection with a peripheral device, an example portable audio player is described as one example peripheral device that can interface with the DHCT and require a downloaded device driver. After the description of an example portable audio player, some timing diagrams are used to describe the interactions at the headend, at the DHCT, and between the DHCT, headend, and a portable audio player to request, download, and/or receive a device driver for the portable audio player. Finally, some example methods from the perspective of the DHCT and the headend are described for providing device drivers for a peripheral device connected to the DHCT.

The preferred embodiments of the invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many other examples contemplated but not shown.

FIG. 1 is a block diagram depicting a non-limiting example of a subscriber television system (STS) 10, in accordance with one embodiment of the invention. In this example, the STS 10 includes a headend 11 and a digital home communication terminal (DHCT) 16 that are coupled via a communications network 18. It will be understood that the STS 10 shown in FIG. 1 is merely illustrative and should not be construed as implying any limitations upon the scope of the preferred embodiments of the invention. For example, although single components (e.g., a headend and a DHCT) are illustrated in FIG. 1, the STS 10 can feature a plurality of any one of the illustrated components, or may be configured with alternative embodiments for any one of the individual components or with yet other additional components not enumerated above. Subscriber television systems also included within the scope of the preferred embodiments of the invention include systems not utilizing physical structured cabling for transmission, such as, but not limited to, satellite systems.

A DHCT 16 is typically situated at the residence or place of business of a user and may be a stand-alone unit or integrated into another device such as, for example, a television set or a personal computer or other display devices, or an audio device, such as a programmable radio, among other devices. The DHCT 16 receives signals (including video, audio and/or other data) from the headend 11 through the network 18 and provides reverse information to the headend 11 through the network 18.

The headend 11 preferably receives content from a content provider (not shown). The headend 11 may include one or more server devices (not shown) for providing video, audio, and/or data to media client devices such as the DHCT 16. The headend 11 and the DHCT 16 cooperate to provide a user with television services via a television set (not shown). The television services may include, for example, broadcast television services, music services, cable television services, premium television services, video-on-demand (VOD) services, and/or pay-per-view (PPV) services, among others.

Figure 2:
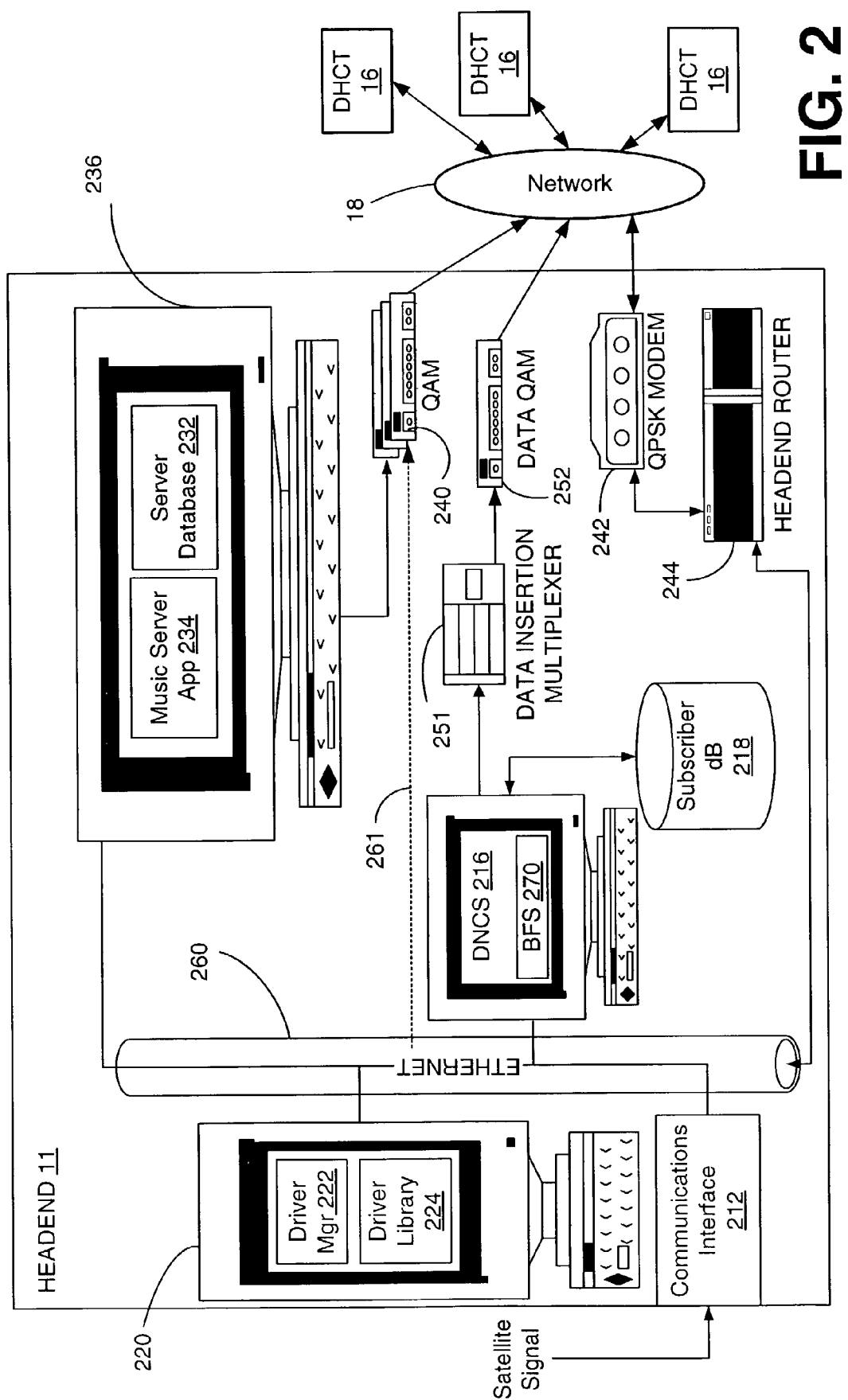
FIG. 2 is a block diagram of select components of an example headend as depicted in FIG. 1 and related equipment that delivers music and device drivers to digital home communication terminals (DHCTs), in accordance with one embodiment of the invention.

FIG. 2 depicts a non-limiting example of selected components of a headend 11 that is configured in accordance with one embodiment of the present invention. In particular, FIG. 2 is used to illustrate some of the cooperating elements used to search for, retrieve, and download a device driver suitable for the communication format used by a portable audio player that receives downloaded music from a music service, in accordance with one embodiment of the invention. It will be understood that the headend 11 shown in FIG. 2 is merely illustrative and should not be construed as implying any limitations upon the scope of the preferred embodiments of the invention. For example, the example headend 11 can include one or more application servers and accompanying components to provide media-on-demand, broadcast services (via digital and/or analog transmission signals), data services such as interactive programming guide (IPG) data, and other broadcast services. Further, the headend 11 can provide device drivers for peripheral devices used in cooperation with other services, such as printing services, among others. The headend 11 receives content from a variety of service and content providers (not shown), which can provide input in a variety of ways. The headend 11 combines the content from the various sources and distributes the content to subscribers via the distribution systems of the network 18. The input signals may be transmitted from sources to the headend 11 via a variety of transmission paths, including satellites (not shown) and terrestrial broadcast transmitters and antennas (not shown).

In one implementation, a digital audio service (not shown) broadcasts many different audio channels to the headend 11, which broadcasts the audio channels over the network 18 to consumers for playback. The broadcast channels originate with a programming provider (not shown) who transmits the audio channels to a satellite (not shown). The headend 11 receives the satellite signal and, after processing according to mechanisms described below, transmits a reformatted signal to a plurality of DHCTs 16. Subscribing DHCTs 16 can decode the signal for playback of the original audio content, or the signal can be passed along and decoded at a peripheral device for playback. In a typical digital audio service, there will be about 40 channels of audio.

As shown, the selected components of the example headend 11 include a communications interface 212, a digital network control system (DNCS) 216, a music server 236, a device driver server 220, a quadrature amplitude modulation (QAM) modulator 240 and quadrature phase shift keying (QPSK) modem 242, and router 244. It will be understood by those having ordinary skill in the art that the example headend 11 can include additional components, such as additional servers, switches, QAM modulators, conditional access and digital rights management components, communication interfaces, among others, or can omit components. In one implementation, the satellite signal is received by the communications interface 212, and the demodulated data from that signal can be sent via Ethernet 260 (or in other embodiments, via asynchronous transport mode (ATM), asynchronous system interface (ASI), or some communications protocol for storage on a server) to the music server 236, among other servers. That is, music data in the music data stream sourced via the satellite signal is "recorded" by the music server 236. For example, tags can be embedded in the music data stream that can delineate the beginning and end of songs, using for example MPEG-2 transport splice points or clocking mechanisms inherent to MPEG that are synchronized to the headend clock (not shown). The music server 236 and a plurality of other servers, such as the device driver server 220, are connected to the DNCS 216 via the Ethernet 260. Stored data in the music server 236 is preferably forwarded to the QAM modulator 240, where it is converted/remodulated to a QAM format for transmission over the network 18.

In another implementation, functionality of the music server 236 and its associated databases can be implemented external to the headend 11. In such a case, the music data is received via a satellite signal that is received at the communications interface 212, converted to Ethernet (or ASI, Digi-Cable Headend Expansion Interface (DHEI), etc.), and then routed to the QAM modulator 240 (via connection 261) for transmission to subscribers as a QAM modulated signal. Identifying indicia for instances of music (e.g., songs), such as title and/or artist data, are included by the programming originator at a satellite uplink site (not shown).

In still other implementations, music service functionality is provided by the headend 11 and locations external to the headend 11. For example, the music server 236 is resident at the headend 11, but supplied with precompressed audio (e.g., tapes, discs, etc.) that has been licensed for installation on the music server 236. Additionally, music can be provided using sources external to the headend 11 as indicated in the last described implementation, wherein the music server 236 is bypassed such that not all the content sourced externally from the headend 11 is available on the music server 236, and vice versa. In still other implementations, the music server 236 can include precompressed audio and also record music off the music data stream sourced from the satellite signal.

The DNCS 216 provides management, monitoring, and control of the network's elements and of the broadcast services provided to users. The DNCS 216 includes, among other modules, a subscriber database 218 that includes information about the subscribers in an illuminated region for such purposes as billing information, data survey, and marketing, among others. In one implementation, the DNCS 216 uses a data insertion multiplexer 251 and a data QAM 252 to insert in-band broadcast file system (BFS) data into an MPEG-2 transport stream that is broadcast and received via a DHCT communication interface (not shown) and tuner system (not shown). In one implementation, the QPSK modem 242 is responsible for transporting the out of band IP (Internet protocol) datagram traffic between the distribution headend 11 and the DHCT 16. Data transmitted or received by the QPSK modem 242 may be routed by a headend router 244. The headend router 244 may be used to deliver upstream data to the various server applications, such as a music server application 234 and a driver manager 222. For example, in one embodiment, an indication of a peripheral device connection (i.e., connected to the DHCT 16) can be received in the out of band signal path of the network 18 from one or more DHCTs at the QPSK modem 242 and routed by the router 244 to the device driver server 220 to access and retrieve a device driver for the connected peripheral device. Note that the out of band signal path, though shown and described using QPSK modulation, can be implemented using QAM or QPSK modulation in the forward or reverse signal path depending on, among other factors, customer requirements.

The device driver server 220 is run by the driver manager 222, and also includes a device driver library 224 that the driver manager 222 searches through and from which it retrieves a device driver for download to a DHCT 16 that requested the device driver. The device driver library 224 can be implemented as a database or other data structure. The device driver library 224 includes device drivers from a plurality of vendors; the device drivers having various functionality and configured with one or more communication formats. In one embodiment, one or more device drivers stored in the device driver library 224 can be downloaded to the DHCT 16 and loaded into memory of the DHCT 16 for use by an application and/or an operating system that is communicating with a connected (or interfaced) peripheral device. Each device driver preferably includes a common interface to either an application in the DHCT 16 or an operating system in the DHCT 16. Equipped with knowledge of the specification of this common interface, individual hardware vendors or other third parties can produce device drivers for their peripheral devices and contribute them to the device driver library 224. The installation of the required device drivers is preferably performed at the headend 11 (or other locations that include headend functionality) by the cable operator (or application vendor) when the cable operator determines there is sufficient demand for the device driver and the device driver meets specified quality and/or security standards defined by the cable operator.

Note that conditional access can also be employed in some embodiments of the invention. For example, the device driver could potentially be signed by the cable operator using a private key of the cable operator that is part of a conditional access system (not shown) as part of the process of installing the driver on the device driver server 220 at the headend 1. The DHCT 16 could then request and receive the device driver and use the conditional access system (which includes the DHCTs verified local copy of the cable operator's public key) to verify that the device driver was not modified on the device driver server 220 or in transit to the DHCT 16.

In other embodiments, the device drivers can be delivered to the DHCT 16 using a broadcast file system (BFS) server 270. Such a mechanism can be employed in a one-way (e.g., satellite) system or two way interactive system. Applications on both the headend 11 and the DHCT 16 (FIG. 3A) can access the data stored in the BFS server 270 in a similar manner to a file system found on operating systems. The BFS server 270 is a part of a broadcast file system that has a counterpart BFS client (not shown) in a DHCT 16 connected to the network 18. The BFS server 270 repeatedly sends data on a data carousel (not shown) over a period of time in cyclical repeated fashion so that a DHCT 16 that is in need of reading any particular data file or parts thereof may receive it when needed, such as when requested by a user or one or more of its internal running processes, for example. Thus, in one implementation, device drivers and information identifying a particular peripheral, operating system (OS), and/or DHCT model for each device driver are transmitted in a cyclical fashion. The DHCT 16 scans the BFS data stream looking for a device driver that is compatible with itself and the connected peripheral device upon detecting the connection of the peripheral device. For example, a BFS file can list all device drivers, operating system/DHCT compatibility levels, and/or their associated filenames in a table (not shown) transmitted on a periodic basis (e.g., every 5 seconds). That is, the table is used to locate the correct device driver for the connected peripheral device. The DHCT 16 (via the BFS client) receives and opens the BFS file specified in the table to retrieve the device driver.

The music server 236 is preferably run under the control of the music server application 234. The music server 236 includes other modules and databases (i.e., structured data such as a database or data structure) that are used by the music server application 234 to provide a music service, in accordance with one embodiment of the invention. Such modules include functionality for digital rights management and royalty payments, conditional access for secure transmission of audio content, compressed music storage for storage of digital files (i.e., a database for the compressed songs), and/or a plurality of other databases internal or external to the music server 236.

In one implementation, the music server 236 stores identifying indicia associated with a song (e.g., title, artist, album, and/or other information that references and/or is descriptive of a song) a user has designated for download to a peripheral device. This identifying indicia is preferably saved in a user-specific playlist (not shown) until the music server 236 receives a request from the DHCT to download the song or songs referenced in the playlist. In one implementation, after providing a device driver via the device driver server 220, the music server application 234 accesses its internal databases to retrieve the songs associated with the saved identifying indicia in the playlist and download the songs to the connected portable audio player. The headend 11 includes mechanisms for transporting music to the requesting DHCT 16 over the network 18, including using one or more QAM modulators 240, which can deliver songs in a compressed format using MPEG standards and/or formatted using transmission control protocol/internet protocol (TCP/IP), among others. Other mechanisms for transporting music from the headend 11 include delivering the music over the out of band signal path in addition to the in band signal path, as described above.

Figure 3A:
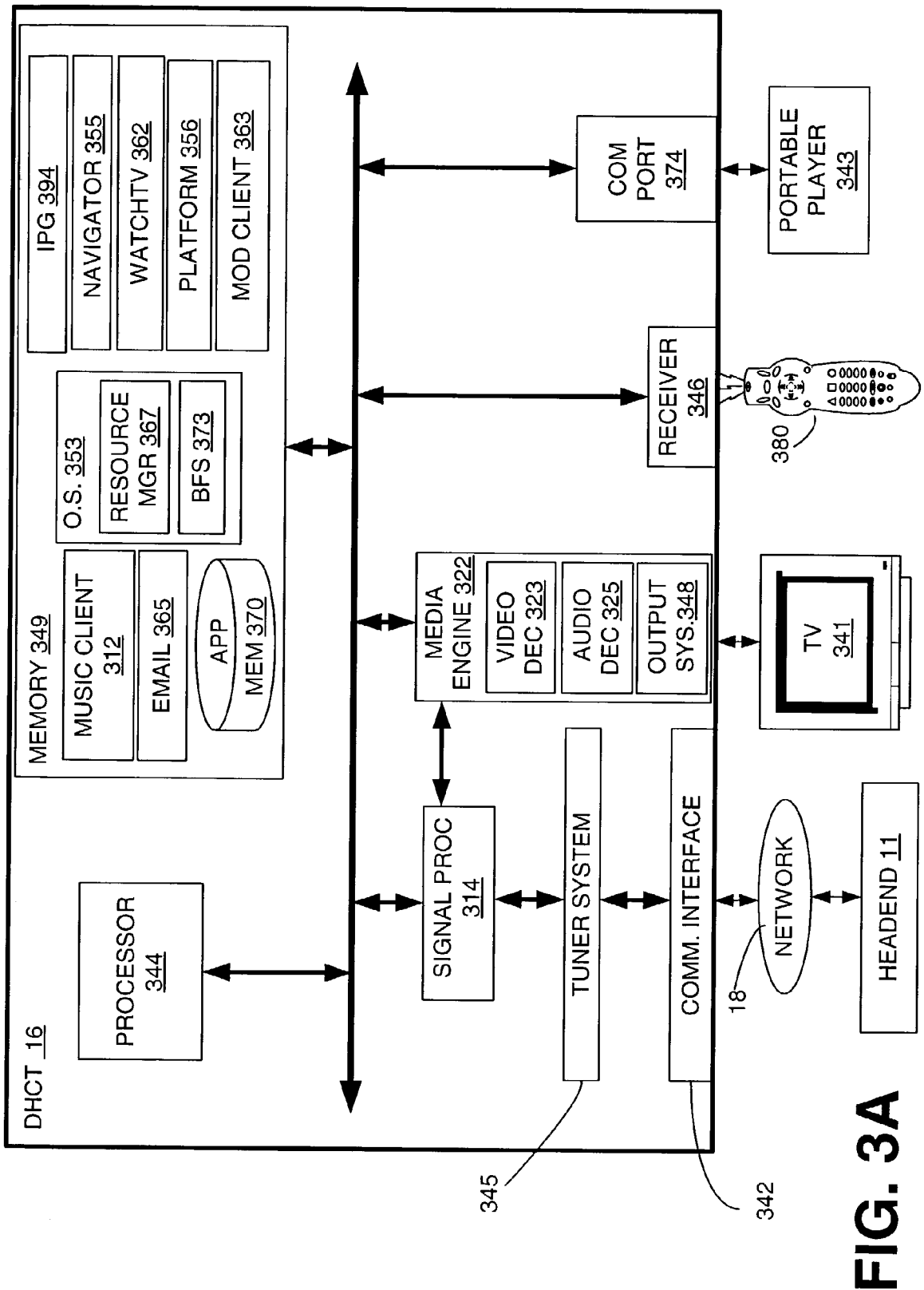
FIG. 3A is a block diagram of select components of an example DHCT as depicted in FIG. 1 and related equipment that receives music and device drivers from the example headend of FIG. 2, and that communicates with a portable audio player, in accordance with one embodiment of the invention.

FIG. 3A is a block diagram illustration of an example DHCT 16 that is coupled to a headend 11, a television set 341, and a portable audio player 343, in accordance with one embodiment of the invention. It will be understood that the DHCT 16 shown in FIG. 3A is merely illustrative and should not be construed as implying any limitations upon the scope of the preferred embodiments of the invention. For example, some of the functionality performed by applications executed in the DHCT 16 (such as a media on demand (MOD) application 363) may instead be performed completely or in part at the headend 11 and vice versa, or not at all in some embodiments. The DHCT 16 preferably includes a communications interface 342 for receiving signals (video, audio and/or other data) from the headend 11 through the network 18, and provides reverse information to the headend 11 through the network 18.

The DHCT 16 preferably includes one or more processors, such as processor 344, for controlling operations of the DHCT 16, an output system 348 for driving the television display of a television set 341, and a tuner system 345 for tuning into a particular television channel or frequency to present content and for sending and receiving various types of content to and from the headend 11 over the network 18. The DHCT 16 may include, in other embodiments, multiple tuners for receiving downloaded (or transmitted) content. The tuner system 345 enables the DHCT 16 to tune to downstream content transmissions, thereby allowing a user to receive digital and/or analog content delivered in the downstream transmission via the subscriber television system 10 (FIG. 1). The tuner system 345 includes, in one implementation, an out-of-band tuner for bi-directional QPSK data communication and one or more QAM tuners (in band) for receiving television signals. For example, an application or an operating system 353, in cooperation with the processor 344, can request a device driver for a newly connected peripheral device, such as the portable audio player 343, through the out of band tuner of the tuner system 345. This request, as described above, can be received at the headend 11 and processed accordingly. Additionally, a receiver 346 receives externally generated information, such as user inputs or commands from an input device, such as remote control device 380, or other devices.

The DHCT 16 processes analog and/or digital transmission signals for presentation to the television set 341, and/or for downloading to the portable audio player 343. In some embodiments, a storage device (not shown) can be included to provide, among other functions, time shifted presentations of content. The DHCT 16 preferably includes a signal processing system 314 and a media engine 322. The components of the signal processing system 314 are capable of QAM demodulation, forward error correction, and demultiplexing of MPEG-2 transport streams, and parsing of elementary streams and packetized elementary streams. Additional components, not shown, include an analog decoder and compression engine for processing an analog transmission signal and, in one implementation, converting it to compressed audio and video streams that are produced in accordance with the syntax and semantics of a designated audio and video coding method, such as that specified by the MPEG-2 audio and MPEG-2 video ISO (International Organization for Standardization or ISO) standard, among others.

In one implementation, the signal processing system 314 outputs parsed elementary streams and presents them to the media engine 322 for decompression by a video decompression engine 323 and an audio decompression engine 325, and then presented to the TV set 341 via an output system 348. The DHCT 16 can include functionality for decryption and digital rights management, among other functionality. Downloaded music carried as parsed elementary streams and slated for playback on the portable audio player 343 can, in one implementation, be presented to the portable audio player 343 via a communications port 374 preferably configured as a USB or Firewire connection.

One having ordinary skill in the art will understand that the signal processing system 314 will preferably include other components not shown, including memory, decryptors, samplers, digitizers (e.g., analog-to-digital converters), and multiplexers, among other components. Further, it will be understood that one or more of the components listed above will interface with the processor 344 and/or memory 349 (and/or dedicated memory for a particular component), to facilitate data transfer and/or processing of the video and/or audio signal for presentation, storage, and/or downloads to peripheral devices.

Memory 349, which may include volatile and/or non-volatile memory, stores one or more programmed software applications, herein referred to as applications, which contain instructions that may be executed by the processor 344 under the auspices of the operating system 353. Note that an application typically includes a client part and a server counterpart that cooperate to provide the complete functionality of the application. Data required as input by an application is stored in memory 349 and read by processor 344 from memory 349 as need be during the course of the application's execution. Input data for an application may be data stored in memory 349 by a secondary application or other source, either internal or external to the DHCT 16, or may be data that was created with the application at the time it was generated as a software application program. Data transmitted by the headend 11 may be received via the communications interface 342, whereas user input may be received from an input device via receiver 346. Data generated by an application is stored in memory 349 by the processor 344 during the course of the application's execution.

An executable program or algorithm corresponding to an operating system component, or to a client platform component, or to an application, or to respective parts thereof, can reside in memory 349, or in a local storage device (not shown) externally connected to or integrated into the DHCT 16 and be transferred into memory 349 for execution. Likewise, data input for an executable program can reside in the storage device and be transferred into memory 349 for use by an executable program or algorithm. In addition, data output by an executable program can be written into memory 349 by an executable program or algorithm and be transferred into the storage device. In other embodiments, the executable code is not transferred, but instead, functionality is effected by other mechanisms. Note that one or more of the components shown in memory 349 can be stored in volatile memory in some embodiments, and non-volatile memory in other embodiments.

An application referred to as a navigator 355 is resident in memory 349 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu presented on a screen display.

The memory 349 also includes a platform library 356. The platform library 356 is a collection of utilities useful to applications, such as a timer manager, a compression manager, a configuration manager, a hypertext markup language (HTML) parser, a database manager, a widget toolkit, a string manager, and other utilities (not shown). These utilities are accessed by applications via application programming interfaces (APIs) as necessary so that each application does not have to contain these utilities.

Computer functionality of the DHCT 16 is provided by an operating system 353. Among other modules, the operating system 353 includes the resource manager 367 that provides an interface to resources of the DHCT 16 such as, for example, computing resources, and a BFS client 373. As described above, the BFS server 270 (FIG. 2) is in constant communication with the BFS client 373 to provide data and applications to the DHCTs 16 in the subscriber television system 10 (FIG. 1), including providing device drivers in some embodiments.

Other components of memory 349 include an interactive program guide (IPG) application 394 for providing interactive program guide services, a WatchTV application 362 for providing broadcast television services, a music client application 312 (explained below), a media-on-demand (MOD) application 363 for providing on-demand services, and an e-mail application 365. Memory 349 also includes application memory 370 that various applications may use for storing and/or retrieving data. It should be clear to one with ordinary skill in the art that these applications are not limiting and merely serve as examples for embodiments of the invention. These applications, and others provided by the subscriber television system operator, are top-level software entities on the network for providing services to the user.

The music client application 312 is the client pair of a client server music application pair. The music client application 312 includes functionality that enables a user to designate a currently playing song for an immediate or future download to the DHCT 16 and/or a connected portable audio player 343. In one implementation, the user can be listening to a song played on the TV set 341 or other device. Upon hearing a song that he or she likes, the user can designate the song for download using an input device such as a remote control device 380. Information about the designated song can be stored in a user-specific playlist (not shown) maintained at the headend 11. Upon detecting the portable audio player connection to the DHCT 16, the DHCT 16 sends a download request to the music application server 236 (FIG. 2), the songs referenced in the playlist are retrieved, and the music is downloaded to the portable audio player 343. Further information on the mechanisms included in downloading music referenced in a playlist to a portable audio player can be found in the patent application entitled, "SELECTING AND DOWNLOADING CONTENT TO A PORTABLE PLAYER," having Ser. No. 10/289,051, filed on the same day as this application, and hereby incorporated by reference herein in its entirety.

The DHCT 16 can also include one or more wireless or wired interfaces, also called communication ports 374, for receiving and/or downloading data to peripheral devices, such as the portable audio player 343. For instance, the DHCT 16 may feature USB (Universal Serial Bus), Ethernet (for connection to a computer), IEEE-1394 (for connection to content devices in an entertainment center), serial, and/or parallel ports, as well as wireless communication ports for Bluetooth, 802.11 networks, etc. Other peripheral interfaces can be used, including peripheral component interconnect (PCI), for example, for connecting to other peripheral devices such as MPEG encoders, graphics cards, additional tuners, MPEG decoders, etc.

Figure 3B:
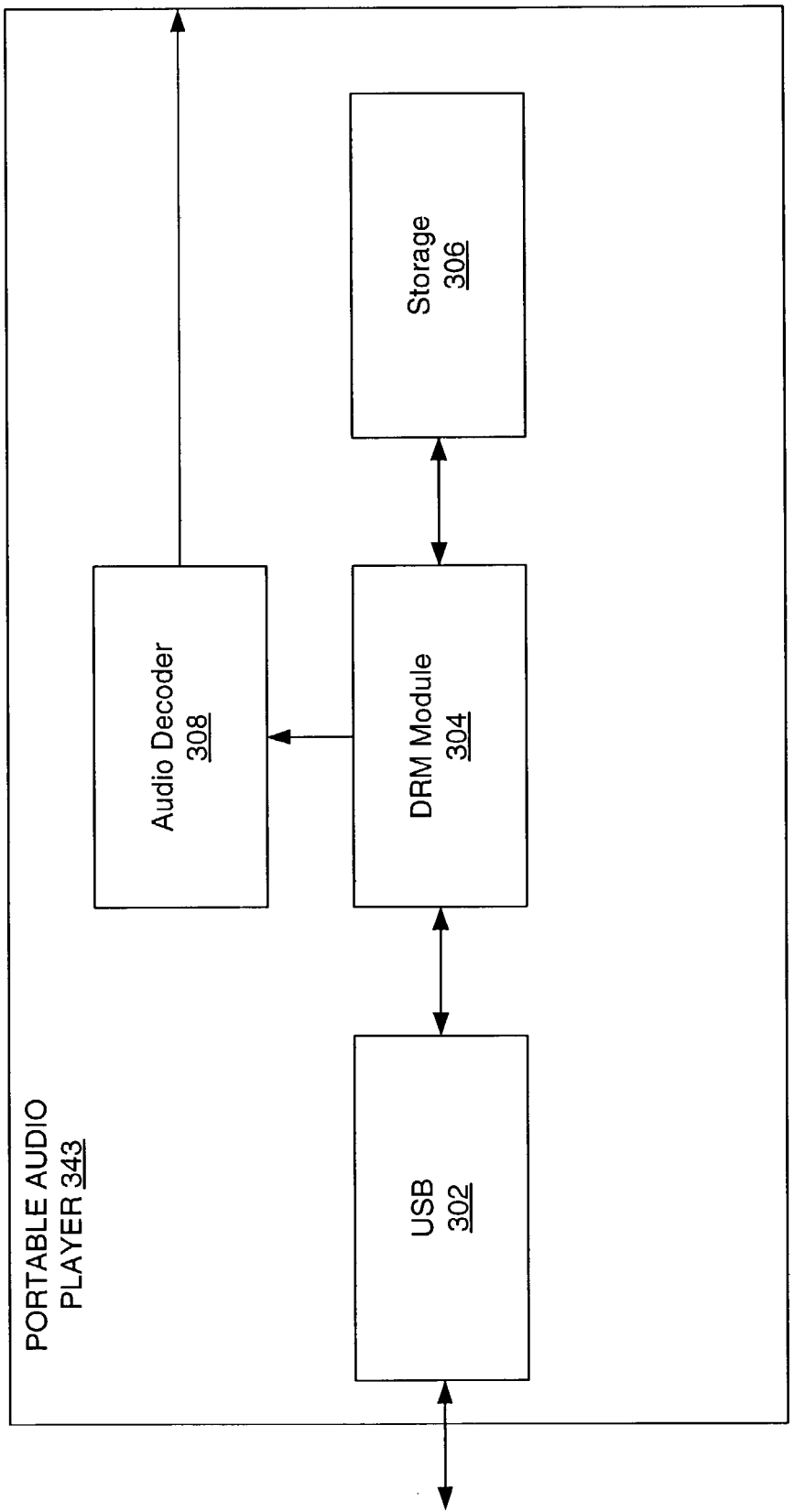
FIG. 3B is a block diagram of an example portable audio player connected to the example DHCT of FIG. 3A, in accordance with one embodiment of the invention.

FIG. 3B is a block diagram of one example portable audio player 343 that can be connected to the communications port 374 (FIG. 3A) configured as a conventional USB port, in accordance with one embodiment of the invention. Although a portable audio player 343 is described herein, other peripheral devices (including digital cameras, printers, etc.) and other port configurations and/or communication formats are considered to be within the scope of the preferred embodiments. As shown, the portable audio player 343 preferably includes a USB connector 302 for communicating with the DHCT 16 (FIG. 3A), a digital rights management (DRM) module 304 for providing digital rights management (e.g., managing of licensing fees and royalty payments), storage 306 for the downloaded music, and an audio decoder 308 for enabling playback of the original audio. It will be understood that the example portable audio player 343 is for illustration only, and that one skilled in the art will understand that the portable audio player 343 can be equipped with additional or fewer components, such as memory, a processor, communication software, and/or other well known portable audio player components, or other configurations. For example, peripheral devices such as the portable audio player 343 can interface with the DHCT 16 using other interfaces, such as Firewire.

Figure 4:
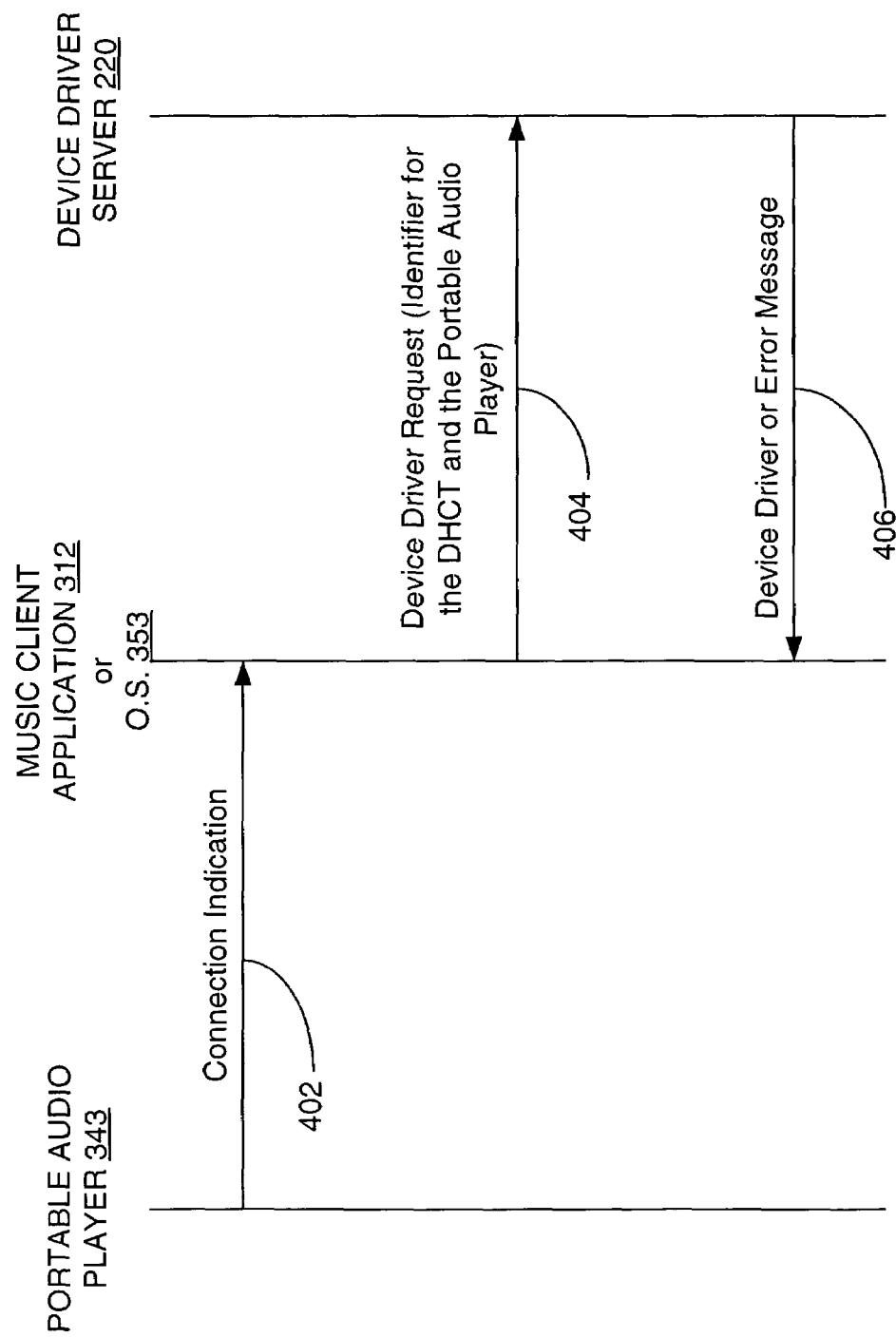
FIG. 4 is a timing diagram that illustrates some example interactions in the DHCT to request a device driver from the headend of FIG. 2 for the connected portable audio player of FIG. 3B, in accordance with one embodiment of the invention.
Figure 5:
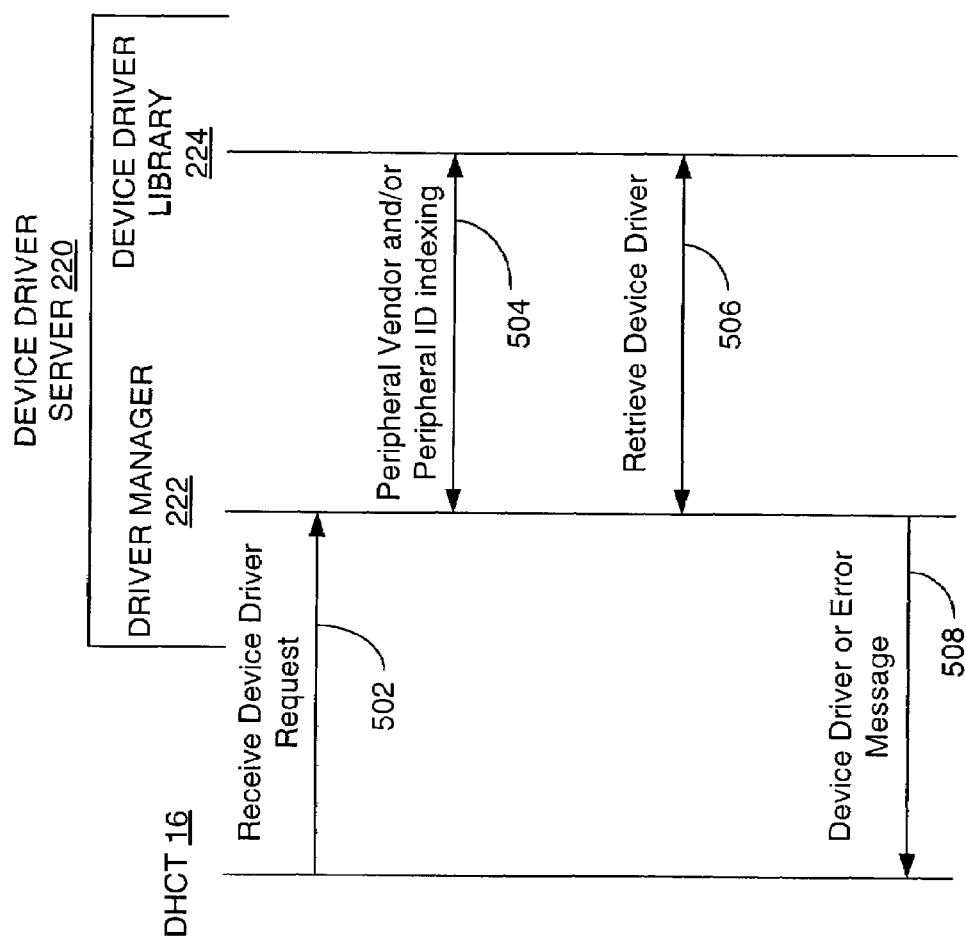
FIG. 5 is a timing diagram that illustrates some example interactions in the headend depicted in FIG. 2 when receiving a request from the DHCT of FIG. 3A for a device driver, in accordance with one embodiment of the invention.

The preferred embodiments of the invention include mechanisms to retrieve and download a device driver from a library of device drivers stored in the device driver library 224 (FIG. 2) to a DHCT 16 (FIG. 3A), the DHCT 16 requesting the device driver in response to being connected with a peripheral device. FIGS. 4 and 5 are timing diagrams that illustrate some example interactions that occur in the headend 11 (FIG. 2), the DHCT 16 (FIG. 3A), and between the headend 11 and the DHCT 16 to provide a device driver for a portable audio player 343 connected to the DHCT 16, in accordance with one embodiment of the invention.

FIG. 4 is a timing diagram of the interactions that occur at the DHCT 16 (FIG. 3A) to request and receive a device driver from the device driver server 220 in response to a connection of a portable audio player 343 at the DHCT 16, in accordance with one embodiment of the invention. It will be understood that other peripheral devices will preferably be handled using similar mechanisms. Further, it will be understood that references to the performance of operations by such entities as the operating system 353, the device driver, or an application will be understood to include operations whereby the processor 344 performs these tasks under the control of these or other entities. After a user connects the portable audio player 343, for example, step 402 includes receiving an indication of a connection. The DHCT connector, configured as USB as one example among many others, enables the identification of the portable audio player 343. Many modern interfaces, such as PCI and USB provide vendor and device identification (ID) information to enable the DHCT 16 to determine a vendor and device ID for a peripheral device when the device is connected to the DHCT 16. Vendor and device ID are included in registers that peripheral devices implement at similar locations in similar ways. For example, access to these registers is typically standardized so that the same code in a DHCT 16 will work for all peripheral devices. In the preferred embodiments of the invention, generalized driver code (resident for example in the operating system 353) is preferably executed by the processor 344 to read these registers out of any peripheral device, and once read, the complete device driver unique to the peripheral device can be requested for retrieval from the headend 11.

In response to the connection, a request is made to the device driver server 220 (by either the operating system 353 in one embodiment, or in other embodiments, a client application that has registered with the operating system 353 for this connection event (such as the music client application 312)) (step 404). As described above, the request can include an identifier of the peripheral device connected and an identifier for the DHCT 16. The identifier for the DHCT 16 can include an WP address in one embodiment, or in other embodiments, may include such information as a serial number and/or media access control (MAC) address of the requesting DHCT 16, in addition to or in lieu of the IP address. The DNCS 216 (FIG. 2) preferably provides the IP address using the MAC address, serial number, and/or secure micro serial number for the particular DHCT 16. Additional DHCT related information can be provided, including an operating system/hardware revision level (or alternatively, the only device drivers that are loaded into the DHCT 16 can be for a particular running operating system/hardware revision level, or such information can be determined elsewhere in the system). The identifier for the peripheral device can include the portable audio player vendor and/or the ID number. This request is received at the device driver server 220, which after processing the request, responds to the registered client application or the operating system 353 (step 406). If the device driver is unavailable, an error message is presented to the user. The error message can be in the form of a dialog box presented to the user, or other indication such as a blinking light on the DHCT, or an email message, among others feedback mechanisms. If the device driver is available, the response includes downloading the requested device driver to the DHCT 16.

Upon receiving the downloaded device driver, the operating system 353 (i.e., the processor 344 running under control of the operating system 353) preferably places the downloaded device driver in memory 349 (FIG. 3A) and notes for which peripheral device this downloaded device driver is intended. When application calls are made that will access the peripheral device (such as the music application 312 in response to a connection of the portable audio player 343), the operating system 353 passes these calls to the device driver for that peripheral device. A peripheral device will typically have N functions that it performs. For example, the portable audio player 343 might have an open function, a close function, a write song function, a delete song function, and a list songs function. The manner in which arguments are passed to each of these five functions is preferably standardized (i.e., the stack frame for each function looks the same or similar regardless of the device driver being called). The code to implement each of these five functions may vary in length depending on the individual device driver. Thus, a table (not shown) is constructed that is at the first byte of the device driver. This table includes pointers to each of these five functions within the device driver (basically a list of five numbers corresponding to the addresses of the functions). For example, the device driver code may appear as follows:

address 0: offset to open function (5)
address 1: offset to close function (11)
address 2: offset to read function (20)
address 3: offset to write function (26)
address 4: offset to some other function (40)
address 5-10: code to implement open function
address 11-19: code to implement close function
address 20-25: code to implement read function
address 26-39: code to implement write function
address 40-50: code to implement some other function Addresses 0-4 are the table, and executable code begins at address 5. All offsets are relative to the first address of the device driver.

When the device driver is downloaded, the operating system 353 locates the device driver in an area of memory 349 that is not currently in use. When the application (e.g., the music application 312) calls the operating system open function, the application passes an argument specifying that the target of the open function is a peripheral device (e.g., the portable audio player 343). The operating system 353 finds the address of the device driver, adds the address to the number in table entry zero (i.e., the address of the open function instructions) of the device driver and jumps to the calculated address. The device driver code is then executed, enabling communication with the portable audio player 343.

As one example implementation, the operating system 353 finds a vacant area of memory 349 at say address 300, and loads the device driver there. When the operating system 353 calls the device driver "write function" for example, operation proceeds as follows:

(1) the address of the device driver is loaded into a register, $R1=300$;

(2) the offset into the table of the write function is loaded into a second register. This offset is fixed for all peripherals of a given class (e.g., audio players), $R2=3$;

(3) the two registers are added together, replacing the contents of the first with the sum, $R1=R1+R2=300+3=303$;

(4) the offset from the address in R1 is loaded into R2, $R2=*R1=*(303)=26$;

(5) the address of the device driver is loaded into a register, $R1=300$;

(6) R1 and R2 are added together to calculate the address of the executable code, $R1=R1+R2=300+26=326$;

(7) a jump with link (i.e., a jump to subroutine) is performed to the address stored in the register, jmp R1 (or jmp 326);

(8) execution of the code at address 326 begins, which is the write function executable code. At the end of the code, the write function jumps to the saved link address (i.e., performs a return from subroutine) and the code continues where it left off, enabling control to be passed to the operating system 353 (or an application that registered for this event).

The operating system 353 then returns control to the application (e.g., music application 312) and the open function is completed. If a close function was implemented, the base address of the device driver would be added to the number stored at table entry 1 (the address of the close function) and the operating system 353 would call this new address. Similar mechanisms are employed for these and other functions. Note that the implementation described above is one example among many, and that the preferred embodiments of the invention include other mechanisms for passing control to the device driver.

FIG. 5 is a timing diagram of the interactions occurring between the headend components when a request for a device driver is issued to the device driver server 220 (FIG. 2). As shown, step 502 includes receiving the device driver request from the DHCT 16. The device driver request is preferably an IP request that includes the identification of the requesting DHCT and the vendor of the peripheral device and/or the ID number of the peripheral device. With continued reference to FIG. 2, in one implementation, when received at the headend 11, the device driver request is preferably routed by the router 244 from the QPSK modem 242 to the driver manager 222 of the device driver server 220 via the Ethernet 260. The driver manager 222 uses the information of the device driver request as an index to search the device driver library 224 (step 504). The device driver library 224 can be formatted as a database or other data structure. Although shown as internal to the device driver server 220, the device driver library 224 can be located external to the device driver server 220 in other embodiments.

Step 506 includes the driver manager 222 retrieving the device driver corresponding to the information included in the device driver request from the device driver library 224. The driver manager 222 arranges for the device driver to be sent to the requesting DHCT 16 over the network 18 (FIG. 1) using other headend components (step 508), as described above in association with FIG. 2. If the driver manager 222 fails to retrieve the device driver from the device driver library 224 (e.g., if the requested device driver is not there, or if there is an error in retrieving the device driver, etc.), then the driver manager 222 communicates an error message to the requesting DHCT (step 508). In some embodiments, the driver manager 222 can also log a message to a log file (not shown) in the device driver server 220, or located elsewhere, that can be used by the cable operator to evaluate what types of device drivers (and thus peripheral devices) the cable operator may want to support in the future.

As one example implementation, with reference to FIGS. 2 and 3A, if the portable audio player 343 is connected, the music client application 312 will preferably send a request for a stored playlist that references songs the user has previously designated for download. Further, in response to the connection, if a suitable (e.g., having the proper communication format) device driver was not stored locally for the connected portable audio player 343, generalized driver code resident in the operating system 353 determines the vendor and ID number of the connected portable audio player 343. A request is then made by the operating system 353 (or passed to the music client application 312, which makes the request) out of band to the driver manager 222. This request preferably includes the vendor number and ID of the portable audio player 343, in addition to the IP address, serial number, and/or MAC address of the DHCT 16. The driver manager 222, upon receiving the request, searches for a device driver for that particular portable audio player 343 in the device driver library 224. The device driver is retrieved by the driver manager 222, which effects the download of the device driver (preferably via the QPSK modem 242) to the operating system 353 (or to the music client application 312, which passes the device driver to the operating system 353). The operating system 353 loads the device driver into memory 349 and enables the loaded device driver to take temporary control to implement a write to the portable audio player 343 based on the music client application 312 requesting songs referenced in the playlist. The portable audio player 343 then receives the downloaded music referenced in the playlist.

Figure 6:
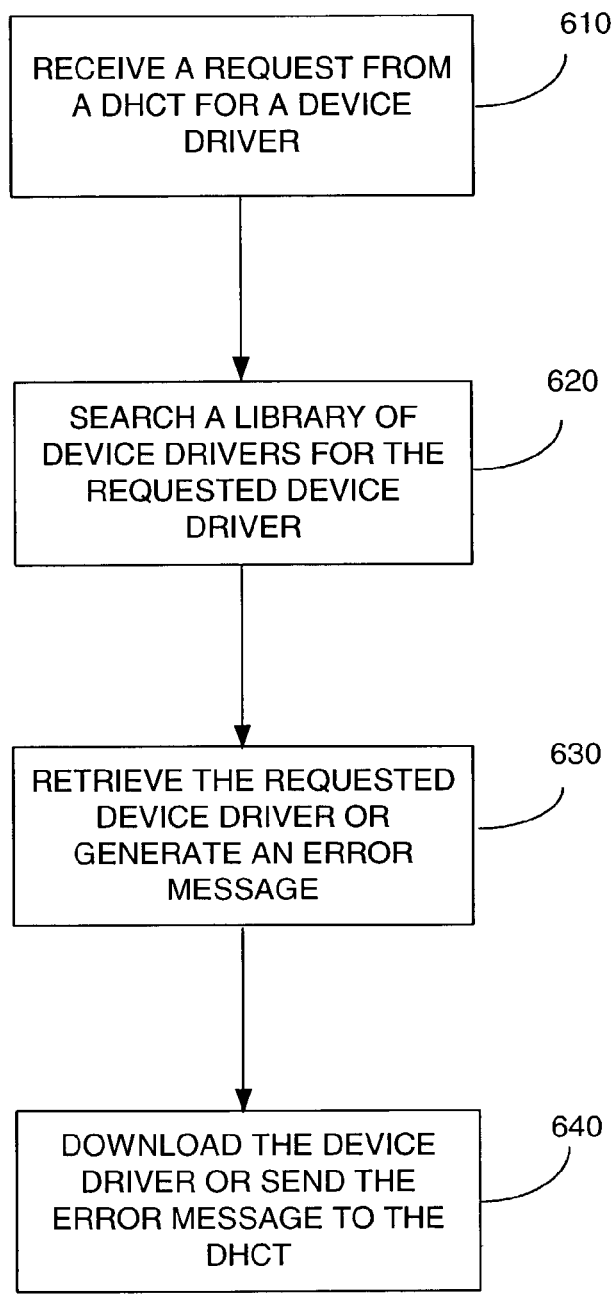
FIG. 6 is a flow diagram of one example method for receiving and processing a request made by the DHCT of FIG. 3A for a device driver stored among a plurality of device drivers at the headend of FIG. 2, in accordance with one embodiment of the invention.
Figure 7:
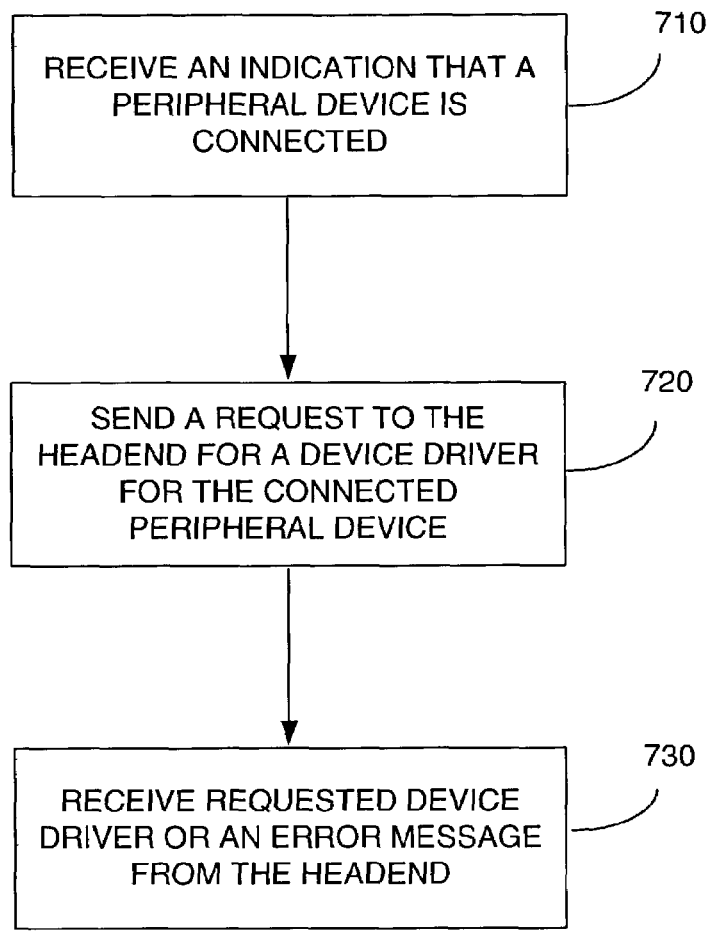
FIG. 7 is a flow diagram of one example method for receiving an indication of a peripheral device connection at an application or operating system of the DHCT of FIG. 3A, and requesting and receiving a requested device driver from the headend of FIG. 2, in accordance with one embodiment of the invention.

FIGS. 6 and 7 include flow diagrams illustrating example methods for providing and receiving a device driver for a connected peripheral device, in accordance with one embodiment of the invention. The blocks in the flow diagrams of FIGS. 6-7 should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Referring to FIG. 6, step 610 includes receiving a request from a DHCT 16 (FIG. 3A) for a device driver. The request can include the particular vendor of the peripheral device for which the device driver is requested and/or the ID number of the peripheral device. The request can also include an IP address, MAC address, and/or serial number of the requesting DHCT 16. Step 620 includes searching a library of device drivers for a device driver matching the information (e.g., the peripheral device vendor and/or ID) included in the request. Step 630 includes retrieving the requested device driver or generating an error message when failing to retrieve the device driver. Step 640 includes downloading the device driver or sending the error message to the DHCT 16.

The method illustrated in FIG. 7 is understood in the context of the operating system 353 or a registered application (i.e., registered an interest in operations to and/or from a connected peripheral device). Referring to FIG. 7, step 710 includes receiving an indication that a peripheral device has been connected. Step 720 includes sending a request to the headend 11 for a device driver that can be used to communicate with the connected peripheral device. Step 730 includes receiving the requested device driver, or an error message if the request could not be fulfilled.

Note that although a request for a single device driver has been described herein, the preferred embodiments of the invention can process multiple requests for device drivers.

The driver manager 222, the driver library 224, the operating system 353, the music client application 312, and other applications can be implemented in hardware, software, firmware, or a combination thereof. In the preferred embodiment(s), driver manager 222, the driver library 224, the driver manager 222, the operating system 353, the music client application 312, and other applications are implemented in software or firmware that is stored in a memory and that is executed by a suitable instruction execution system. If implemented in hardware, as in an alternative embodiment, the driver manager 222, the driver library 224, driver manager 222, the operating system 353, the music client application 312, and other applications may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The driver manager 222, the driver library 224, driver manager 222, the operating system 353, the music client application 312, and other applications, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least following is claimed:

1. A method for downloading device drivers for peripheral devices to a media client device, the method comprising the steps of:

receiving a request at a remote server from a media client device for a device driver in response to a peripheral device interfacing with the media client device, wherein the request includes an identification of the media client device that includes at least one of a media access control address and a secure micro serial number, wherein the step of receiving a request includes receiving at least one of a peripheral device vendor identification and peripheral device identification number; and responsive to receiving the request, searching for the device driver among a plurality of device drivers stored at the remote server using at least one of the peripheral device vendor identification and the peripheral device identification number and downloading the device driver from the remote server to the media client device, wherein downloading the device driver includes scanning a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device.

2. The method of claim 1, further including the step of storing the device driver and a plurality of other device drivers used for a plurality of peripheral devices of varying communication formats in a data structure at the remote server.

3. The method of claim 2, wherein the step of storing includes the step of indexing the plurality of device drivers by at least one of a peripheral device vendor identification and a peripheral device identification number.

4. The method of claim 1, further including the step of retrieving the device driver from the remote server.

5. The method of claim 1, wherein the step of downloading the device driver includes the step of downloading the device driver in packets transmitted in an out of band transmission signal using at least one of a quadrature amplitude modulation and a quadrature phase shift keying modulation.

6. The method of claim 1, wherein the step of downloading the device driver includes the step of downloading the device driver in packets transmitted in an in band transmission signal using at least one of a quadrature amplitude modulation and a quadrature phase shift keying modulation.

7. The method of claim 1, wherein the remote server is located in at least one of a headend and a hub.

8. A method for downloading device drivers for peripheral devices to a media client device, the method comprising the steps of:

receiving a request at a remote server from a media client device for a device driver in response to a peripheral device interfacing with the media client device, wherein the remote server is located in at least one of a headend and a hub, wherein the step of receiving a request includes the steps of receiving an identification of the media client device, wherein the identification can include at least one of a media access control address and a secure micro serial number, and receiving at least one of a peripheral device vendor identification and peripheral device identification number;

responsive to receiving the request, searching for the requested device driver in a data structure at the remote server, the data structure including a plurality of device drivers for a plurality of peripheral devices having various communication formats;

retrieving the requested device driver from the data structure; and downloading the device driver from the remote server to the media client device, wherein downloading the device driver includes scanning a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device.

9. The method of claim 8, further including the step of indexing the plurality of device drivers in the data structure by at least one of a peripheral device vendor identification and a peripheral device identification number.

10. The method of claim 8, wherein the step of downloading the device driver includes the step of downloading the device driver in packets transmitted in an out of band transmission signal using at least one of a quadrature amplitude modulation and a quadrature phase shift keying modulation.

11. The method of claim 8, wherein the step of downloading the device driver includes the step of downloading the device driver in packets transmitted in an in band transmission signal using at least one of a quadrature amplitude modulation and a quadrature phase shift keying modulation.

12. The method of claim 8, wherein the steps of searching includes the steps of searching for the device driver using at least one of the peripheral device vendor identification and the peripheral device identification number.

13. A method for downloading device drivers for peripheral devices to a media client device, the method comprising the steps of:
storing a plurality of device drivers in a data structure at a remote server, the device drivers used for a plurality of peripheral devices of varying communication formats;
indexing the plurality of device drivers by at least one of a peripheral device vendor identification and a peripheral device identification number;
receiving a request at a remote server from a media client device for a device driver in response to a peripheral device interfacing with the media client device, wherein the step of receiving a request includes the steps of receiving an identification of the media client device, wherein the identification can include at least one of a media access control address and a secure micro serial number, and receiving at least one of a peripheral device vendor identification and peripheral device identification number;
responsive to receiving the request, searching for the device driver in the data structure using at least one of a peripheral device vendor identification and a peripheral device identification number of the peripheral device as an index;
retrieving the device driver from the data structure; and
downloading the device driver from the remote server to the media client device, wherein downloading the device driver includes scanning a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device.

14. A method for loading drivers for peripheral devices to a media client device, the method comprising the steps of:
detecting an interfacing of a peripheral device, wherein the step of detecting includes receiving a peripheral device vendor identification and identification number from the peripheral device;
responsive to the detection, requesting a device driver associated with the peripheral device from a remote server, wherein the step of requesting includes sending at least one of the peripheral device vendor identification and the peripheral device identification number, wherein such request includes sending an identification of the media client device, wherein the identification can include at least one of a media access control address and a secure micro serial number; and
receiving a device driver associated with the peripheral device from the remote server, wherein receiving the device driver associated with the peripheral device includes scanning a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device.

15. The method of claim 14, wherein the step of receiving the device driver includes receiving the device driver in packets transmitted in an out of band transmission signal that uses at least one of a quadrature amplitude modulation and a quadrature phase shift keying modulation.

16. The method of claim 14, wherein the step of receiving the device driver includes receiving the device driver in packets transmitted in an in band transmission signal that uses at least one of a quadrature amplitude modulation and a quadrature phase shift keying modulation.

17. The method of claim 14, wherein the step of receiving the device driver includes the steps of loading the device driver into memory and enabling the device driver to control the transfer of application related content between the media client device and the peripheral device.

18. A method for loading drivers for peripheral devices to a media client device, the method comprising the steps of:
detecting an interfacing of a peripheral device, wherein the step of detecting includes receiving a peripheral device vendor identification and identification number from the peripheral device;
in response to the detection, requesting a device driver associated with the peripheral device from a remote server, wherein the step of requesting includes sending an identification of the media client device, wherein the identification can include at least one of a media access control address and a secure micro serial number, and sending at least one of a peripheral device vendor identification and a peripheral device identification number; and
receiving the device driver associated with the peripheral device from the remote server, wherein the step of receiving the device driver includes the steps of scanning a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device, loading the device driver into memory and enabling the device driver to control the transfer of application related content between the media client device and the peripheral device.

19. A system for downloading drivers for peripheral devices to a media client device, the system comprising:
a memory with logic; and
a processor configured with the logic to receive a request at a remote server from a media client device for a device driver in response to a peripheral device interfacing with the media client device, wherein the request includes an identification of the media client device that includes at least one of a media access control address and a secure micro serial number, wherein the processor is further configured with the logic to receive at least one of a peripheral device vendor identification and a peripheral device identification number, wherein the processor is further configured with the logic to, responsive to receiving the request, search for the device driver among a plurality of device drivers stored at the remote server using at least one of the peripheral device vendor identification and the peripheral device identification number, wherein the processor is further configured with the logic to, responsive to receiving the request, download the device driver to the media client device, wherein the processor is further configured with the logic to scan a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device.

20. The system of claim 19, wherein the processor is further configured with the logic to store the device driver and a plurality of other device drivers used for a plurality of peripheral devices of varying communication formats in a data structure.

21. The system of claim 20, wherein the processor is further configured with the logic to index the plurality of device drivers by at least one of a peripheral device vendor identification and a peripheral device identification number.

22. The system of claim 19, wherein the processor is further configured with the logic to retrieve the device driver from the remote server.

23. The system of claim 19, wherein the processor is further configured with the logic to download the device driver in packets transmitted in an out of band transmission signal using at least one of a quadrature amplitude modulation and a quadrature phase shift keying modulation.

24. The system of claim 19, wherein the processor is further configured with the logic to download the device driver in packets transmitted in an in band transmission signal using at least one of a quadrature amplitude modulation and a quadrature phase shift keying modulation.

25. The system of claim 19, wherein the memory, the logic, and the processor are located in the remote server, the remote server being located in at least one of a headend and a hub.

26. A system for downloading drivers for peripheral devices to a media client device, the system comprising:
a memory with logic; and
a processor configured with the logic to receive a request at a remote server from a media client device for a device driver in response to a peripheral device interfacing with the media client device, wherein the processor is further configured with the logic to receive an identification of the media client device and at least one of a peripheral device vendor identification and a peripheral device identification number, wherein the processor is further configured with the logic to search for a device driver of a peripheral device using at least one of the peripheral device vendor identification and the peripheral device identification number, wherein the processor is further configured with the logic to retrieve the device driver of the at least one of the peripheral device vendor identification and the peripheral device identification number, wherein the processor is further configured with the logic to, responsive to receiving the request, search for the requested device driver in a data structure at the remote server, the data structure including a plurality of device drivers for a plurality of peripheral devices having various communication formats, wherein the processor is further configured with the logic to retrieve the requested device driver from the data structure, wherein the processor is further configured with the logic to download the device driver from the remote server to the media client device, and wherein the remote server is located in at least one of a headend and a hub, wherein the processor is further configured with the logic to scan a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device.

27. The system of claim 26, wherein the processor is further configured with the logic to index the plurality of device drivers in the data structure by at least one of a peripheral device vendor identification and a peripheral device identification number.

28. The system of claim 26, wherein the processor is further configured with the logic to download the device driver in packets transmitted in an out of band transmission signal using at least one of a quadrature amplitude modulation and a quadrature phase shift keying modulation.

29. The system of claim 26, wherein the processor is further configured with the logic to download the device driver in packets transmitted in an in band transmission signal using at least one of a quadrature amplitude modulation and a quadrature phase shift keying modulation.

30. The system of claim 26, wherein the memory, the logic, and the processor are located in the remote server, the remote server being located in at least one of a headend and a hub.

31. A system for downloading drivers for peripheral devices to a media client device, the system comprising:
a memory with logic; and
a processor configured with the logic to store a plurality of device drivers in a data structure, the device drivers used for a plurality of peripheral devices of varying communication formats, wherein the processor is further configured with the logic to index the plurality of device drivers by at least one of a peripheral device vendor identification and a peripheral device identification number, wherein the processor is further configured with the logic to receive a request at a remote server from a media client device for a device driver in response to a peripheral device interfacing with the media client device, wherein the processor is further configured with the logic to receive an identification of the media client device and at least one of a peripheral device vendor identification and peripheral device identification number, wherein the processor is further configured with the logic to, responsive to receiving the request, search for the device driver in the data structure using at least one of a peripheral device vendor identification and a peripheral device identification number of the peripheral device as an index, wherein the processor is further configured with the logic to retrieve the device driver from the data structure, wherein the processor is further configured with the logic to download the device driver to the media client device, wherein the processor is further configured with the logic to scan a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device.

32. A system for loading drivers for peripheral devices to a media client device, the system comprising:

a memory with logic; and a processor configured with the logic to receive an indication at a media client device that a peripheral device is interfacing with the media client device and to send an identification of the media client device to a remote server, wherein the identification can include at least one of a media access control address and a secure micro serial number, wherein the processor is further configured with the logic to, receive at least one of a peripheral device vendor identification and a peripheral device identification number, wherein the processor is further configured with the logic to, responsive to receiving the indication, receive a device driver associated with the peripheral device from the remote server, wherein the processor is further configured with the logic to search for the device driver among a plurality of device drivers stored at the remote server using the at least one of the peripheral device vendor identification and the peripheral device identification number, wherein the processor is further configured with the logic to scan a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device.

33. The system of claim 32, wherein the processor is further configured with the logic to receive a peripheral device vendor identification and identification number from the peripheral device.

34. The system of claim 33, wherein the processor is further configured with the logic to send at least one of a peripheral device vendor identification and a peripheral device identification number to the remote server.

35. The system of claim 32, wherein the processor configured with the logic to receive the device driver in packets transmitted in an out of band transmission signal that uses at least one of a quadrature amplitude modulation and a quadrature phase shift keying modulation.

36. The system of claim 32, wherein the processor configured with the logic to receive the device driver in packets transmitted in an in band transmission signal that uses at least one of a quadrature amplitude modulation and a quadrature phase shift keying modulation.

37. The system of claim 32, wherein the processor is further configured with the logic to load the device driver into memory and enable the device driver to control the transfer of application related content between the media client device and the peripheral device.

38. The system of claim 32, wherein the processor is further configured with the logic to request a device driver associated with the peripheral device from the remote server.

39. A system for loading drivers for peripheral devices to a media client device, the system comprising:

a memory with logic; and a processor configured with the logic to receive an indication at a media client device that a peripheral device is interfacing with the media client device, wherein the processor is further configured with the logic to receive a peripheral device vendor identification and identification number from the peripheral device, wherein the processor is further configured with the logic to, responsive to receiving the indication, request a device driver associated with the peripheral device from a remote server, wherein the processor is further configured with the logic to send an identification of the media client device, wherein the identification can include at least one of a media access control address and a secure micro serial number, and send at least one of a peripheral device vendor identification and a peripheral device identification number, wherein the processor is further configured with the logic to receive the device driver associated with the peripheral device from the remote server, wherein the processor is further configured with the logic to load the device driver into memory and enable the device driver to control the transfer of application related content between the media client device and the peripheral device, wherein the processor is further configured with the logic to scan a broadcast file system data stream for a compatible device driver, wherein the broadcast file system data stream comprises a table, the table comprising a plurality of device drivers, compatibility levels, and associated file names, wherein the table is transmitted on a periodic basis, wherein the table is used to locate the device driver for the peripheral device.

* * * * *